No. 607,064. Patented July 12, 1898.
B. J. MALONEY.
MEANS FOR SECURING WHEELS TO AXLES.
(Application filed Oct. 4, 1897.)
(No Model.)
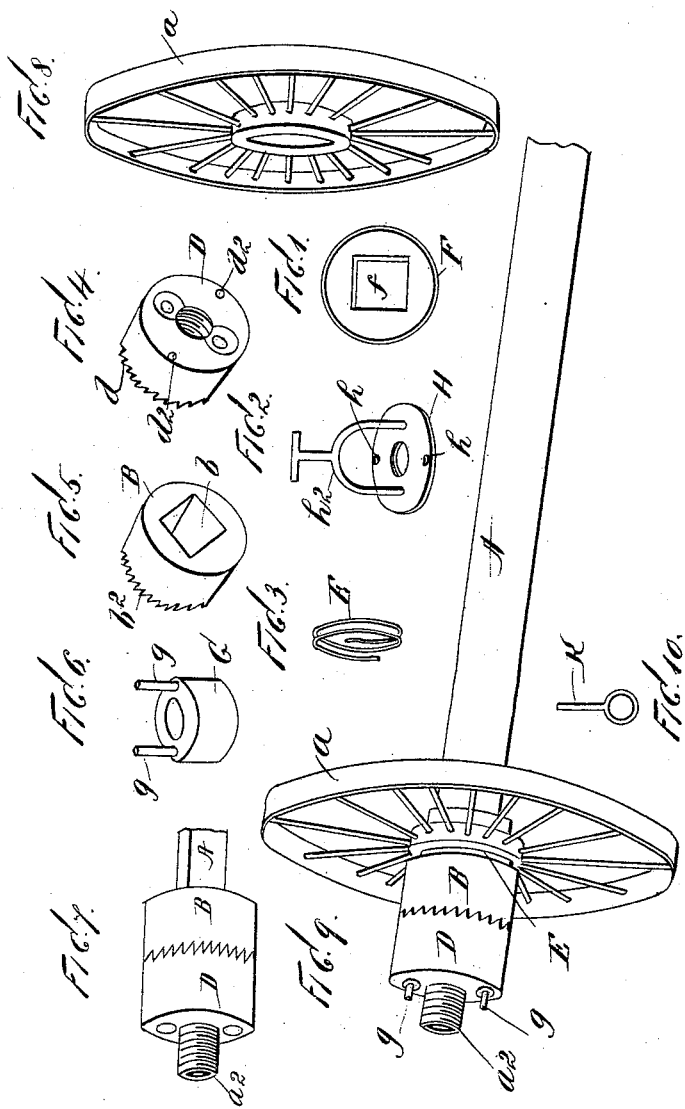
WITNESSES:
John Buckler,
C. Gerst
INVENTOR
Bernard J. Maloney
BY
Edgar Tate & Co.
ATTORNEYS.

UNITED STATES PATENT OFFICE.

BERNARD JOSEPH MALONEY, OF EDINBURGH, SCOTLAND.

MEANS FOR SECURING WHEELS TO AXLES.

SPECIFICATION forming part of Letters Patent No. 607,064, dated July 12, 1898.

Application filed October 4, 1897. Serial No. 653,963. (No model.) Patented in England January 27, 1896, No. 16,571.

*To all whom it may concern:*

Be it known that I, BERNARD JOSEPH MALONEY, a subject of the Queen of Great Britain, residing at Edinburgh, in the county of Mid-Lothian, Scotland, have invented certain new and useful Improvements in Means for Securing Wheels to Axles, of which the following is a full and complete specification, such as will enable those skilled in the art to which it appertains to make and use the same.

This invention relates to means for securing the wheels of carriages and other vehicles to their axles; and the object thereof is to provide improved devices of this class which are simple in construction and operation and by means of which the wheels will be securely held in place on the axle; and with these and other objects in view the invention consists in the construction, combination, and arrangement of parts hereinafter described and claimed.

The invention is the same as that for which Letters Patent were granted in Great Britain January 27, 1896, No. 16,571, and is fully disclosed in the following specification, of which the accompanying drawings form a part, in which—

Figure 1 is a plan view of a beaded metal washer which I employ in connection with a square section of an axle and the bush of a wheel; Fig. 2, a perspective view of a key which I employ and which in practice is placed on the end of the axle when locking or unlocking the nuts which hold the wheel in place; Fig. 3, a perspective view of a spiral spring which is placed on the square part of the axle, as hereinafter described; Fig. 4, a perspective view of a nut which I employ; Fig. 5, a similar view of another nut which forms a part of my improvement; Fig. 6, a perspective view of a short tube provided with studs and which is employed as hereinafter described; Fig. 7, a perspective view of the nuts shown in Figs. 4 and 5, in position for use; Fig. 8, a perspective view of one of the wheels of a carriage or other vehicle; Fig. 9, a perspective view of said wheel and of the nuts shown in Figs. 4 and 5 on the axle, and Fig. 10 is a side view of a pin which is used in connection with the key shown in Fig. 2 and the nut shown in Fig. 4.

In the drawings forming part of this specification the separate parts of my improvement are designated by letters of reference, and in the practice of my invention I provide an axle A, on which is mounted the wheel $a$, and that part of the axle adjacent to the bush of the wheel is squared, and the end thereof is cylindrical in form and provided with a screw-thread, as shown at $a^2$, and on the square portion of the axle is placed a nut B, which is provided with a central opening $b$, similar in form to the squared portion of the axle, and on the screw-threaded part of the axle is fitted a nut D, which corresponds with the nut B, and these nuts are provided on their adjacent faces with ratchet-teeth, as shown at $b^2$, so that when placed upon the axle the said ratchet-teeth will interlock.

A spiral spring E, composed of steel or similar material, is fitted easily on the squared portion of the axle and in such position as to force the nut B in the direction of the nut D, and thus hold said nuts interlocked; and a beaded washer F, provided with a central square opening $f$, is also fitted on the square portion of the axle and directly in contact with the bush of the wheel, and the spring E is placed between this washer and the nut B. When the washer-spring and nuts are placed in position, the wheel is secured to the axle in such a way that it cannot be moved accidentally, and only when the pressure of the spiral spring is removed and the teeth $b^2$ and $d$ of the lock-nuts B and D are separated can the nuts be taken off of the axle. In order to accomplish this result, the two nuts are hollowed out at the toothed ends thereof and a metal tube G is fitted in the hollowed-out parts of said nuts with just sufficient play to allow the teeth on said nuts to lock when said tube is in position, and one end of said tube has a metal cap with a hole in the center to allow the screw end of the axle to pass easily therethrough, and the metal studs $g$ are fastened to said cap, and holes to correspond with these studs are made in the nut D, and said studs $g$, when the nuts are locked, project through the nut D, as shown in Fig. 9, so that when compressed the nut B is pressed back and the teeth thereof are disengaged from the teeth on the nut D. The key used for this purpose is shown in Fig. 2, and said key consists of a metal disk H, of the same diameter as the diameter of the nut D, and when this key is secured on the end of the axle it presses back the studs $g$. They being in connection with the tube G, inside of said lock-nuts, the nut B is forced back and the nut D can then be removed. To simplify the locking and unlocking of the nuts, I make two or more holes $d^2$ in the outer end of the nut D and corresponding holes $h$ in the disk H of the key, and when the key is on the axle I pass a metal pin K (shown in Fig. 10) through the holes $h$ in the disk H of the key and the corresponding holes $d^2$ in the nut D, and I can then by use of the key tighten or loosen the nuts D and D at will. These nuts are indestructible, and the beaded washer F is the only part liable to wear, and it can be replaced at a very small cost, and for choice I make the nuts round on the outer side, but they may be square, if desired, and that part of the axle squared may be made hexagonal in form, if desired, or of any other angular form, in which event the holes $b$ and $f$ in the nuts B and washer F will be similarly formed, and when it is desired to key the wheels on axles, as in the case of railway-carriages or the like, the wheel is put on the squared part of the axle, as in Figs. 1, 3, and 5 in this case, and the nuts B and D act as the journal of the axle.

The tube G, which may more properly be termed a "collar," is shown in Fig. 6, and the key shown in Fig. 2 is provided with a handle $h^2$, and it will be apparent that changes in and modifications of the construction herein described may be made without departing from the spirit of my invention or sacrificing its advantages.

Having fully described my invention, I claim as new and desire to secure by Letters Patent—

1. An axle provided at the ends thereof with a part which is angular in cross-section, and a cylindrical screw-threaded part, and means for securing a wheel thereon, consisting of lock-nuts as B, and D, a washer F, and a spiral spring E, substantially as shown and described.

2. An axle provided at the ends thereof with an angular portion and a screw-threaded portion, a lock-nut adapted to be mounted on said angular portion, and a corresponding lock-nut adapted to be mounted on said screw-threaded portion, said lock-nuts being provided on their adjacent faces with interlocking teeth, a washer which is adapted to be placed between the bush of the wheel, and the lock-nut on the angular portion of the axle, a spring which is adapted to be placed between said washer, and said nut, a tube or collar as G, which is adapted to be placed between said nuts and which is provided with pins which pass through the nut on the screw-threaded portion of the axle, and a key by which said tube or collar is operated, substantially as shown and described.

3. An axle provided at the ends thereof with a washer, and a circular screw-threaded section, and means for securing the wheels thereon consisting of two lock-nuts one of which is mounted on the angular and the other on the screw-threaded portion, said lock-nuts being provided with interlocking teeth, a washer which is placed between the bush of the wheels, and the nut on the angular portion, a collar which is placed between said nuts, and provided with pins which project through the nut on the screw-threaded portion of the axle, a spring placed between said washer and the nut on the angular portion of the axle, and a key by which said collar is operated, substantially as shown and described.

In testimony that I claim the foregoing as my invention I have signed my name, in presence of the subscribing witnesses, this 19th day of August, 1897.

BERNARD JOSEPH MALONEY.

Witnesses:
DAVID MITCHELL,
JAMES WILSON.